US006925577B1

(12) United States Patent
Szucs et al.

(10) Patent No.: US 6,925,577 B1
(45) Date of Patent: Aug. 2, 2005

(54) METHOD FOR RECORDING/STORING MULTIPLE TRANSPORT STREAMS BY DIVIDING INTO SERIES OF PACKETS

(75) Inventors: Paul Szucs, Ostfildern (DE); Markus Veltmann, Tokyo (JP)

(73) Assignee: Sony International (Europe) GmbH, Berlin (DE)

(*) Notice: Subject to any disclaimer, the term of this patent is extended or adjusted under 35 U.S.C. 154(b) by 692 days.

(21) Appl. No.: 09/611,895

(22) Filed: Jul. 7, 2000

Related U.S. Application Data

(63) Continuation-in-part of application No. 09/190,396, filed on Nov. 11, 1998, now abandoned.

(30) Foreign Application Priority Data

Nov. 14, 1997 (EP) .............................. 97120003
Jul. 8, 1999 (EP) .............................. 99113264

(51) Int. Cl.⁷ ................................................ G06F 7/36
(52) U.S. Cl. ..................... 713/600; 370/497; 370/537; 386/46; 386/48; 386/109
(58) Field of Search .......................... 713/600; 370/497; 370/537; 386/46, 48, 109

(56) References Cited

U.S. PATENT DOCUMENTS

| | | | | | |
|---|---|---|---|---|---|
| 5,420,866 | A | * | 5/1995 | Wasilewski | ................ 370/426 |
| 5,619,337 | A |   | 4/1997 | Naimpally | |
| 5,894,328 | A | * | 4/1999 | Negishi | ................ 375/240.25 |
| 5,949,792 | A | * | 9/1999 | Yasuda et al. | ............... 370/474 |
| 5,953,489 | A | * | 9/1999 | Park | ........................... 386/109 |
| 6,014,368 | A | * | 1/2000 | Sanami | ....................... 370/242 |
| 6,055,271 | A | * | 4/2000 | Yasuda et al. | ......... 375/240.26 |
| 6,169,843 | B1 | * | 1/2001 | Lenihan et al. | ............... 386/46 |
| 6,172,988 | B1 | * | 1/2001 | Tiernan et al. | .............. 370/473 |
| 6,181,712 | B1 | * | 1/2001 | Rosengren | .................. 370/474 |
| 6,233,253 | B1 | * | 5/2001 | Settle et al. | ................ 370/474 |
| 6,301,248 | B1 | * | 10/2001 | Jung et al. | .................... 370/392 |
| 6,438,145 | B1 | * | 8/2002 | Movshovich et al. | ....... 370/536 |
| 6,445,872 | B1 | * | 9/2002 | Sano et al. | ..................... 386/46 |
| 2003/0043854 | A1 | * | 3/2003 | Uchide | ........................ 370/498 |

FOREIGN PATENT DOCUMENTS

| | | | |
|---|---|---|---|
| EP | 0 785 675 | 7/1997 | |
| EP | 0 893 913 | 1/1999 | |
| EP | 0 917 355 | 5/1999 | |
| JP | 11122556 A | * 4/1999 | ............ H04N/5/46 |
| WO | WO 95 27977 | 10/1995 | |
| WO | WO 98 40889 | 9/1998 | |

OTHER PUBLICATIONS

IBM TDB vol. 13, issue 8, p. 2159–2160, Title: Audio monitoring and recording for computers; Dtd. Jan. 1, 1971.*
Bloks R H J: "The IEEE–1394 High Speed Serial Bus" Philips Journal of Research, NL, Elsevier, Amsterdam, vol. 50, No. 1, p. 209–216, XP004008212.

* cited by examiner

Primary Examiner—Lynne H. Browne
Assistant Examiner—N. Patel
(74) Attorney, Agent, or Firm—Frommer Lawrence & Haug LLP; William S. Frommer; Dennis M. Smid

(57) ABSTRACT

A method for recording and storing independent and/or simultaneous transport streams of data is suggested. The inventive method comprises at least a recording mode in which at least a first transport stream of data to be recorded/stored is received. The transport streams are divided into series of packets with respect to a predefined clock or with respect to their temporal relationships. To each transport stream and to the series of packets respectively a packet identifier is assigned. A series of partial transport streams is generated from at least said series of packet identifiers and said series of packets. A time series of said partial transport streams based on said clock is recorded and stored as a combined transport stream.

19 Claims, 9 Drawing Sheets

Figure 1:
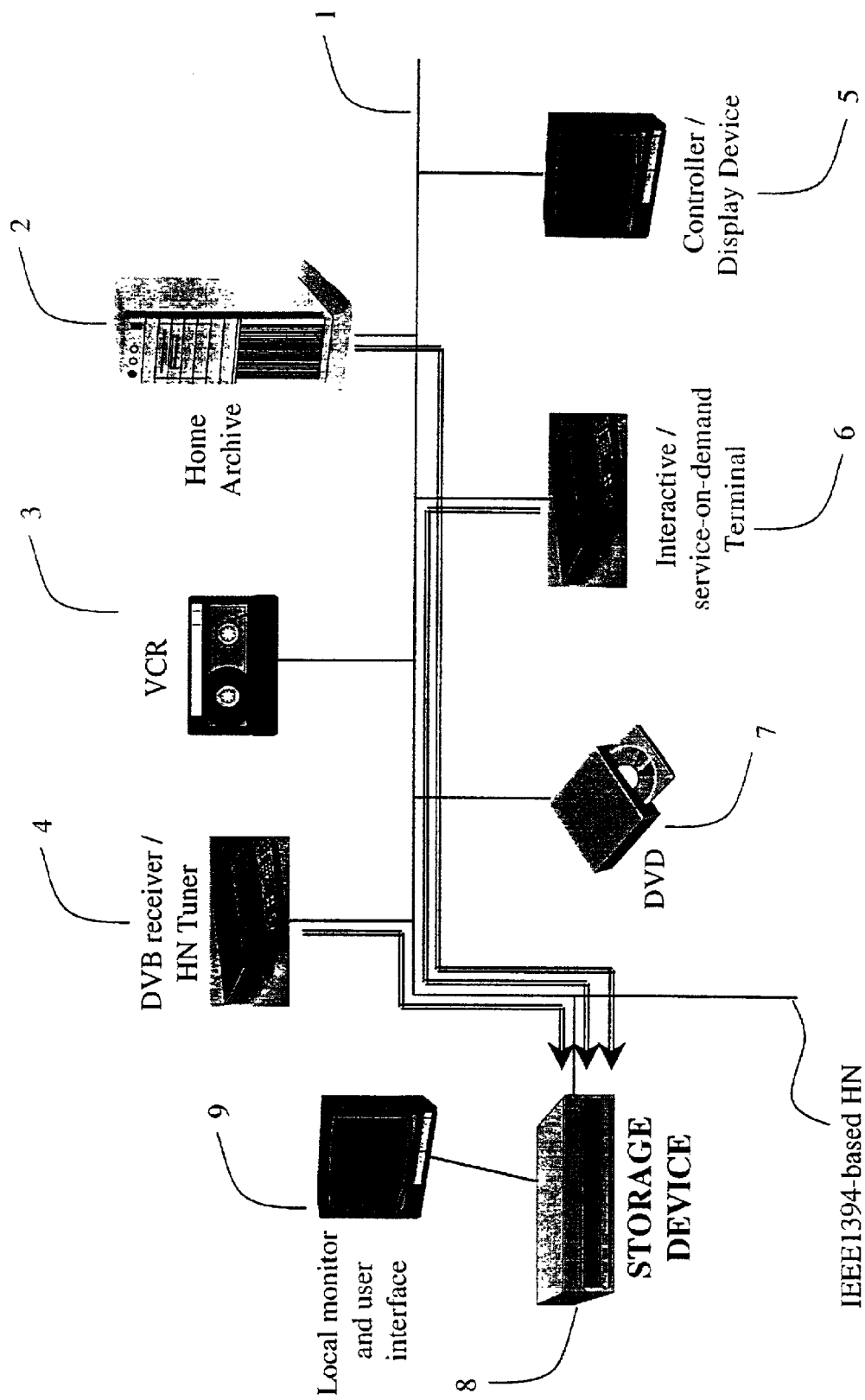

METHOD FOR RECORDING/STORING MULTIPLE TRANSPORT STREAMS BY DIVIDING INTO SERIES OF PACKETS

This application is a continuation-in-part of U.S. Ser. No. 09/190,396, filed Nov. 11, 1998 (now abandoned).

The present invention relates to a method for recording transport streams of data according to the wording of claim 1.

It is a matter of fact that organizing and connecting electronic devices and in particular many types of consumer equipment within a network architecture becomes more and more important. This increasing importance is based on a need of universal data and control exchange between the variety of such equipment.

In particular consumer equipment can be connected and organized with respect to a common network bus and/or interface which is used to receive and to exchange digital as well as analog data. By organizing different consumer equipment and devices with respect to the aforementioned bus structure or the like the concept of the so called home network (HN) is generated.

Within such a home network different devices—e. g. video cassette recorders (VCR), digital audio and video broadcasting receiving devices and tuners (DAB, DVB), magnetic, magneto-optical and optical disc devices (CD-ROM, DVD) and the like—may serve and be embedded as data sources and services.

A known problem in networks and storage media devices connected to such networks of the art is the fact that methods for storing data and storage media devices are in general constrained physically by their nature to have only one physical feed to the particular storage medium or storage medium device. This is in particular the case for tape-based devices, where the tape is capable of processing only a single or possibly a limited number of continuous data streams. The same applies for most disc media, and in particular for laser-based disc media, where only one physical storage feed can be supplied.

Therefore, when applying known methods and devices for recording and storing transport streams of data, the recording process is limited to receive data from only one data stream or channel and therefore from only a single and isolated source of data at anyone time. That means, when state of the art methods and devices for recording and storing transport streams of data are applied to network architectures with a multiplicity of isochronous channels and therefore transport streams of data, only one service fed into the network can be recorded on a particular recording device.

Therefore, it is an object of the present invention to provide a method for recording and storing transport streams of data, which allows for more flexibility and which is capable of recording and storing simultaneous and independent transport streams of data.

That particular object is achieved by the inventive method according to the wording of claim 1. Preferred embodiments of the inventive method for recording and storing transport streams of data are within the scope of the dependent subclaims.

The inventive method for recording/storing independent and/or simultaneous transport streams of data is switchable to at least a first or recording mode. The recording mode comprises the step of receiving at least a first transport stream of data to be recorded/stored. Further, received transport streams are divided into series of packets with respect to a predefined clock and/or with respect to the temporal relationships of said transport streams. To each of said transport streams or series of packets, respectively, a recording header is assigned. Furthermore, a series of partial transport streams is generated from at least said series of recording headers and said series of packets. A time series of said partial transport streams based on said clock is recorded/stored as a complete or combined transport stream.

A basic idea of the inventive method is to classify transport streams of data to be simultaneously recorded with respect to their temporal relationship and/or with respect to a given clock cycle of the method. The temporal relationship may be given by ordering the transport streams with respect to their first appearance in time.

Based on a clock or clock cycle of the method the transport streams and therefore the information content of the transport streams is divided or subdivided into series of (information) packets. For each transport stream, which is continuously from its beginning to its ending, a time series of packets is generated, with each of said packets belonging to a distinct and well-defined clock cycle.

To each transport stream (TS) and therefore to each series of packets (P) a recording header H is generated. The recording header H may essentially describe the temporal relationship of the distinct transport streams TS or channels and therefore may allow to distinguish the transport streams TS and therefore the series of packets and the packets P from each other.

The incoming information, i. e. the complex of all transport streams TS of data, is recorded and stored as a sequence or a series of partial transport streams (ptlTS), each element of the sequence or series of partial transport streams and therefore each partial transport stream ptlTS itself contains the information of all simultaneous transport streams TS of data of a given clock cycle. The whole information content which is received continuously, is represented by recording/storing a complete or combined transport stream CTS, i. e. as a time series or time sequence of said partial transport streams ptlTS, which is based on said clock or clock cycle. The partial transport streams ptlTS for each clock cycle are generated from at least said series of recording headers H and said series of packets P for the respective clock cycle.

Additional information may be included into the partial transport stream ptlTS, which, of course, limits the bandwidth of the method.

A fundamental aspect of the inventive method is therefore to combine and/or multiplex several partial transport streams—each appearing on its own isochronous channel—into a single combined and/or complete transport stream CTS to allow the recording of multiple events simultaneously and to allow further the starting and/or ending the recording of an event while the recording of another event is running.

In accordance with a preferred embodiment of the inventive method the transport streams TS of data are received from a common digital bus system. That particular bus system may be based on an i.LINK®/IEEE 1394-based network bus and/or interface, which has some importance among possible architectures for home networks HN. Of course, further protocols/bus architectures are possible, e. g. IEC61883, AV/C, HAVi®, or the like.

A particular simple and easy to realize embodiment of the inventive method may be achieved by using a clock cycle of constant width/duration or constant frequency, respectively, in the process of dividing said transport streams. In connection with a common digital data bus system the bus cycle of the employed data bus may be used as the clock cycle for dividing such transport streams into packets.

For a particular simple and reliable organization of the incoming information it is suggested to generate each partial transport stream ptlTS with a heading code section indicating at least the start of a new clock cycle/bus cycle, and therefore the beginning of a new recorded/stored partial transport stream ptlTS.

Of course, such a heading code section may be a heading cycle start indicating section CSI which may be present on the network or bus—if any—and may include further information and not only represent the fact that a new cycle is beginning. For instance, the cycle start indicating section CSI may also contain complete time information with respect to the recorded/stored particular partial transport stream ptlTS.

According to a further embodiment of the inventive method the transport streams TS are received by multiplexing and in particular by multiplexing from two or more isochronous channels of said common digital bus system.

Multiplexing in particular from isochronous channels, has the advantage that a predefined temporal structure is given and defined by the process of multiplexing and/or by the temporal structure of the isochronous channels itself.

For a simple evaluation of the series of packets and therefore of the series of partial transport streams ptlTS the recording header H may be generated and/ received with respect to the given temporal relationship according to the multiplexing process and/or according to the temporal relationships of the isochronous channels. The recording headers H may also be generated from or be identical with the so-called packet identifiers PID being present on the bus or network when using distinct data stream concepts, in particular MPEG-2 or the like. The PID on the data bus may be embedded into the packet as is realized for example by the MPEG-2 systems.

In a further embodiment of the inventive method each packet of each of said series of packets is paired and/or concatenated each at a time with said respective recording header H within each partial transport stream ptlTS, in particular with the recording header H preceding the respective packet.

That means that for each distinct clock cycle and for each transport stream a given packet of information is taken and combined with the recording header H belonging to the particular transport stream and therefore to the series of packets of the particular transport stream. If the recording header H precedes the information content of the given clock cycle for the given transport stream TS, the particular information content can reliably be recognized and identified.

In general, the received transport streams TS or at least parts thereof have to be stored or buffered into buffer storage means in advance of and/or during the generation of the partial transport streams ptlTS. This allows a particular reliable organizing of the multiplexing process and therefore avoids the loss of data.

According to the above mentioned application to home networks, video and/or audio data are received at least in part within said transport streams TS.

To allow a rapid information exchange between the components of a home network and rapid recording and storing processes, said video and/or audio data are received in compressed or compactified form, in particular in the MPEG-2 format or the like.

In the application of a home network HN comprising customer equipment and customer advices it is preferred to have the received transport streams TS of data D stored as said series of partial transport streams ptlTS to a physical storage media device, such as magnetic tape devices, optical, magnetical, magneto-optical disc devices or the like.

One of the major advantages of the above described method is that by storing packeted information together with their recording header and/or packet identifier multiple recording processes can be started, continued, and/or terminated independently from each other, as long as the band width of the method—given by the clock cycle—and/or of the employed physical storage media device is sufficient.

Therefore, if—during the receipt of a given number of transport streams TS—recording of a further or additional transport stream TSa is requested, it is checked whether the band width of the method/storage media device allows the further requested transport stream TSa to be recorded. Furthermore, the request for recording the further transport stream TSa is rejected in the case of an insufficient band width. On the other hand, in the case of a sufficient band width the further transport stream TSa is incorporated into the series of former transport streams TS, in particular at a position in accordance to its temporal relationship to the former transport streams and/or to the isochronous channels of the bus system, and is—of course—described by a further recording header Ha or packet identifier of the additional transport stream TSa.

In the case of termination of the request of a distinct transport stream TSd and/or the termination of the distinct transport stream TSd itself—which has actually been in the list or series of transport streams to be recorded for a given time interval—the process of the recording of the residual transport streams TS is continued. The information content of the terminated transport stream TSd—which will then be empty—may be filled with blank information and the position of the residual transport streams will be unchanged.

According to a further embodiment of the inventive method for recording/storing transport streams TS of data, a waiting mode is provided which is entered in the case that the recording requests for all transport streams TS or all transport streams TS itself are terminated.

If all requests for recording data streams are terminated or withdrawn, the inventive method switches to the waiting mode, in which no recording—or playback—process is executed.

In a further embodiment of the inventive method also a playback mode is provided for playing back transport streams TS previously being recorded/stored. Furthermore, said playback mode can be entered only from said waiting mode to avoid conflicts with the requested recording processes.

Some of the basic principles and main advantages of the inventive method for recording and storing transport streams of data over the state of the art methods will be summarized in the following.

As current analog video cassette recorders (VCR) can record only one program, i. e. one distinct transport stream TS of data, at a time onto the running tape—a fact which also applies for the digital video (DV) SD-format of digital video cassette recorders—and as new types of digital storaged media devices have already been developed, in particular to record MPEG-2 transport streams, it has become necessary to develop the inventive method for recording and storing transport streams TS of data which are present on digital data busses employed in known networks and in particular in known home networks.

The proposed inventive method is capable of recording multiple events—i. e. multiple transport streams TS of data—simultaneously. Furthermore, the inventive method as described above is capable of starting and/or ending a process of recording events/transport streams of data, while the recording and storing of other events/transport streams of data remain unaffected.

The problem solved with the inventive method arises, as some kinds of storage media devices are constrained physically by their nature to have only one physical feed to the storage medium. This applies, for example, for tape based devices, where the tape contains only one or maybe several but a limited number of traces for continuous stream data. This also applies for most disc media as optical laser-based discs or magnetical or magneto-optical discs, as only one physical storage feed is accessible in these cases.

With the inventive method it is for the first time possible to receive data not only from one isochronous channel. Therefore—in particular in a network environment such as an i.LINK®/IEEE1394-based network bus/interface, the receipt of data streams not only from a single source but from a variety of data sources connected to the network is possible independently and simultaneously. Additionally, in contrast to the current state of the art, the transport streams of data to be recorded are organized, checked, and processed in a particular reliable manner.

The invention—in particular for transport stream storage devices on the basis of the MPEG-2 format—is capable of recording several events simultaneously, from one or more sources on the network and further capable of commencing and finishing the recording of the events and transport streams while the recording of the other events and/or transport streams is active and uneffected.

Therefore, in a digital home network environment, the storage device can principally interact with or be controlled by one or more digital video broadcasting (DVB) devices or with any other equipment, being able to source digital video data, in particular MPEG-2 partial or full transport streams TS, to interactively select one or several services or transport streams to record simultaneously and concurrently. According to the inventive method all required partial or full transport streams to be recorded into a single complete or combined transport stream are multiplexed and stored on the physical storage medium device.

During a recording, for example when the storage device is already recording an event from a DVB receiver, the user or another user employing another device, can add additional services or transport streams to be recorded, as long as the VCR has free bandwidth to accommodate the additional data streams on the storage medium. Additional services or transport streams can originate from the same transport stream currently being received or from a separate device elsewhere in the home network.

In the recording mode of the inventive method all services or transport streams TS to be recorded/stored may arrive at the storage device via the same interface—for example the i.LINK®/IEEE1394 bus/interface—each on its own isochronous channel. Current 1394 link ICs can monitor only a single channel out of up to 63 possible isochronous channels at a time. Therefore, in a certain realization of the invention a 1394-link-solution is required, which can monitor several isochronous channels simultaneously or which has multiple single-channel 1394-interfaces.

The data from the distinct services/transport streams may arrive within the employed home network in every IEEE1394 bus cycle but need not. There may be of course cycles in which no data are contained for one or more connections, i. e. for one or for more positions in the series of packets. For this reason, the incoming data for each connection/transport stream may be buffered in order to be able to multiplex the data into a continuous combined transport stream CTS.

In a realization for such a buffer storage means, each isochronous channel receiver may place data in a respective and assigned transport packet FIFO buffer (first-in/first-out). A respective transport stream recording processor multiplexes data from each buffer to generate a single combined transport stream CTS to be streamed to the storage medium device. The stored combined transport stream CTS must be compliant, so that reliable coding is guaranteed in the playback mode, in particular not only in the device which made the recording, but also in any other equivalent storage device, for example from another manufacturer.

Of course, during the recording mode additional information has to be included into the partial transport stream ptlTS, for example a program association table PAT, a program map table PMT, selection information table SIT and others, the latter of which describing the particular information units being selected from all information sources existing in a network for the recording/playback process.

Valid PAT, PMT and SIT tables are essentially provided by a program specific information/service information PSI/SI generator block. If services are accepted from different source devices it might be possible that some re-multiplexing is necessary, as the services from different broadcast or storage systems could possibly use common or already occupied recording headers H or PID values. If a particular header or PID processor functionality is not provided by the system, the storage device for recording/storing and playback will decline to record a new service possibly with an already occupied header or PID value, which is then in conflict with current recording processes and therefore with current information contents already been recorded. Therefore, according to the inventive method a storage device and in particular an MPEG TS storage device has to automatically update PSI and SI tables to maintain a compliant combined transport stream CTS in the case when recordings are added or stopped.

To initiate a recording session, the user selects the event to be recorded by navigating the possible devices or data sources in the home network HN. When the user starts the recording process, the mode control of the method and the storage device places the storage device into the record mode. In that particular state any playback request entered by the user or by another user is rejected. However, if a user wishes to record a further event in parallel to be recorded, it is checked on whether or not there is sufficient band width capacity available on recording medium. In the case of a sufficient band width capacity a re-multiplexer checks on whether or not a re-allocation of PIDs is necessary with the introduction and incorporation of the further event to be recorded. When such a re-allocation is necessary the re-multiplexer build new PAT, PMT, SIT tables and inserts them into the multi-event ptlTS while continuing the recording session with the updated tables.

As described above, the provided playback mode may be entered by a user only in the case when all recordings have been terminated and the inventive method or the particular storage device is in the waiting mode. Only in that case the playback of a recorded set of transport streams can be started. An event will be able to be played back from a tape, a disk or any other storage device medium containing multiple events in parallel.

Although there is—in particular for tape media—no standard method available to catalogue a storage mediums complete contents on the storage medium itself, it is possible to use known methods of memory labels or memories in cassette (in DV format) to register the recordings and storings in a proprietary way, so as to make fast indexing easier, in particular without having to spool tape media to scan for the events.

Using the memory in cassette (MIC) index, a quick spool to the start of an event can be achieved. A playback mode is then started. Adding or the disappearance of an event recorded in parallel will not effect the event currently being played back.

When the event being played back is the only event recorded on the storage medium, i. e. when no other events where recorded in parallel, then no playback TS processing is required, as the ptlTS on the storage medium is already valid for the event being played back. If the required event is accompanied by others, or in the case when others appear during a playback, then TS processing is activated and carried out by a TS playback processor. TS processing in this case means the filtering of PID streams belonging to components of other events, the substitution of the PAT, PMT and SIT tables to be valid for the single program ptlTS output to the home network HN, and possibly the re-processing of PIDs which had been changed during the recording, to enable a seamless decode on the display device. For a local display session of an event, a demultiplexer and an A/V decoder are required.

Figure 2:
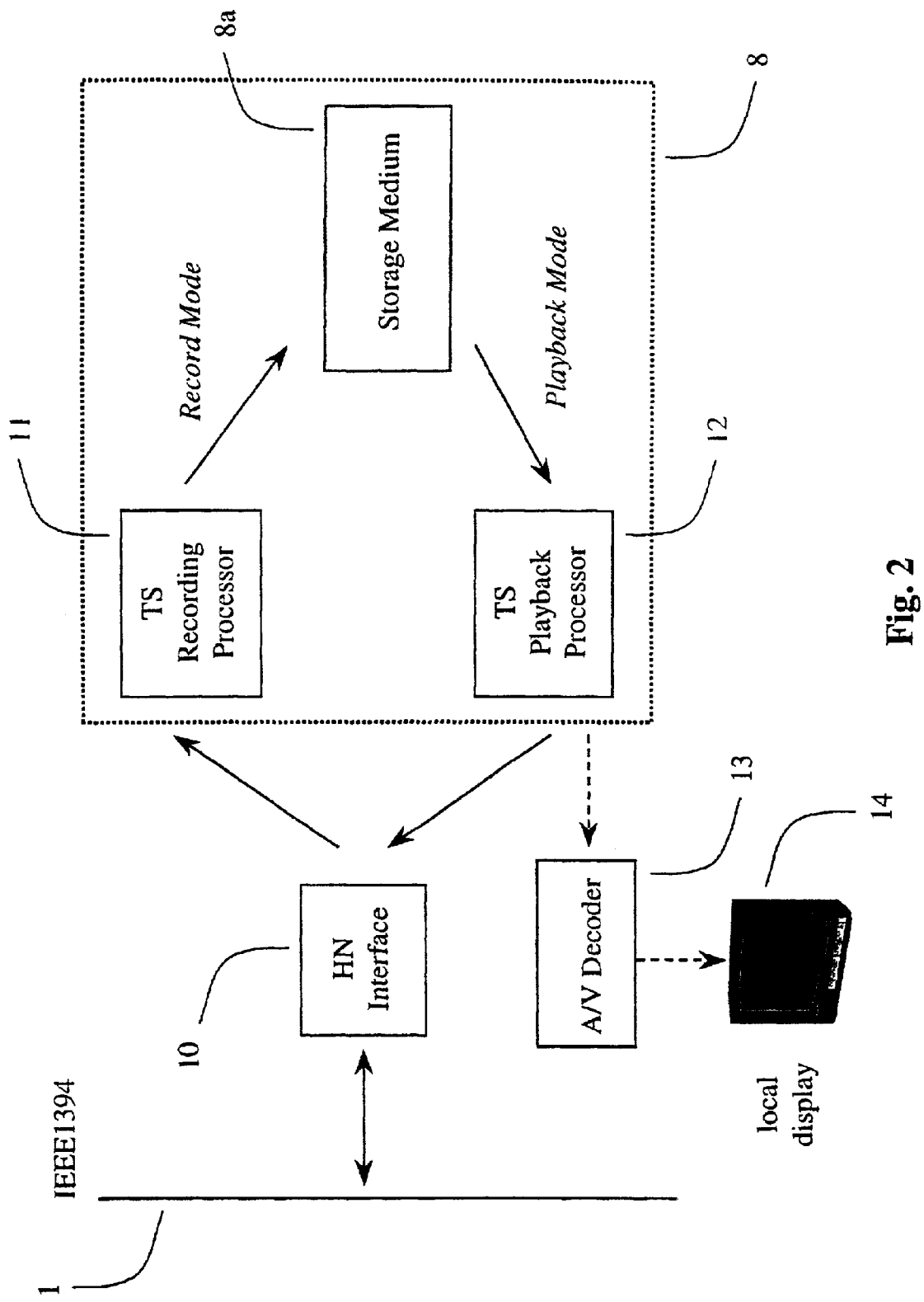
Figure 3:
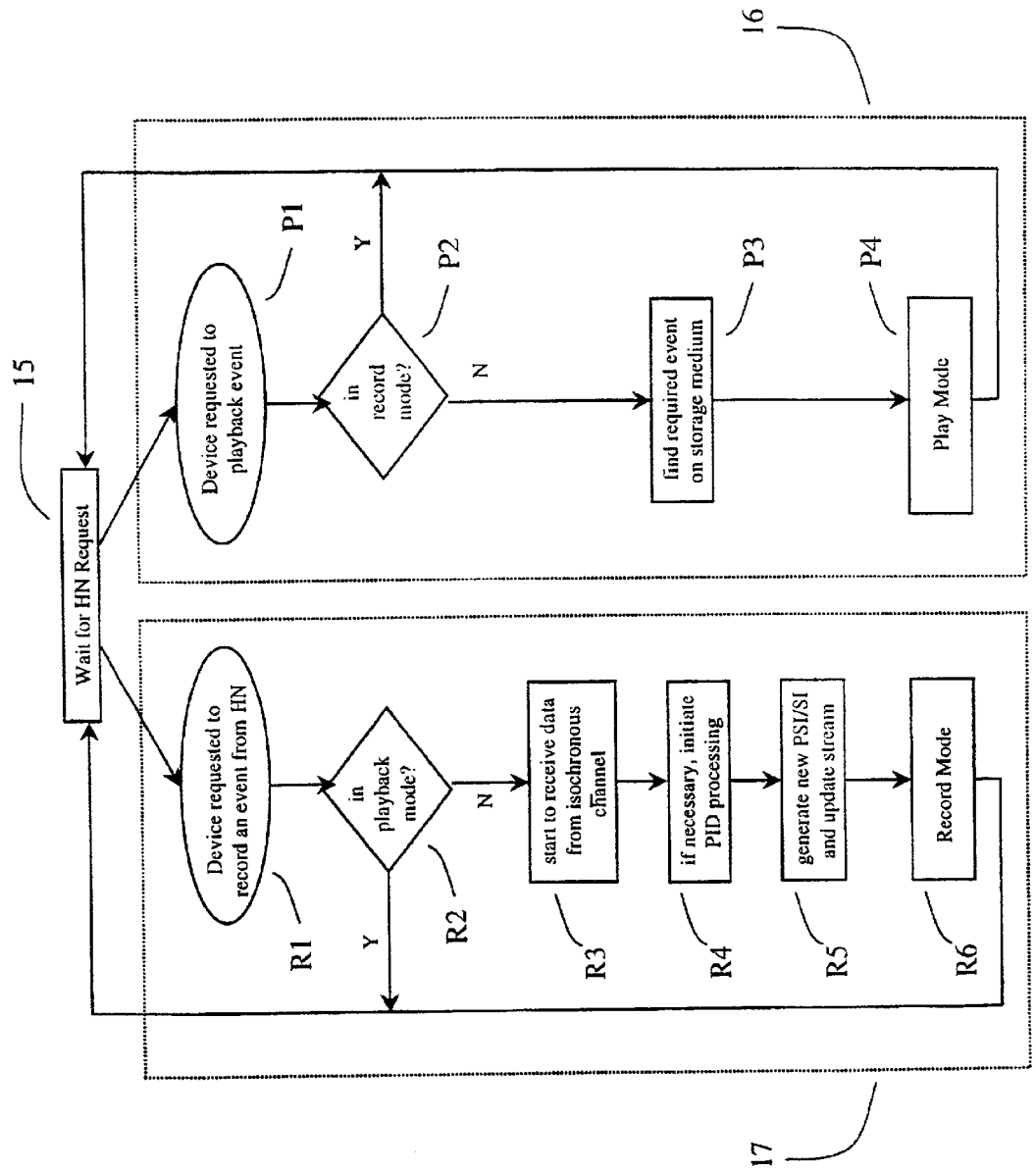
Figure 4A:
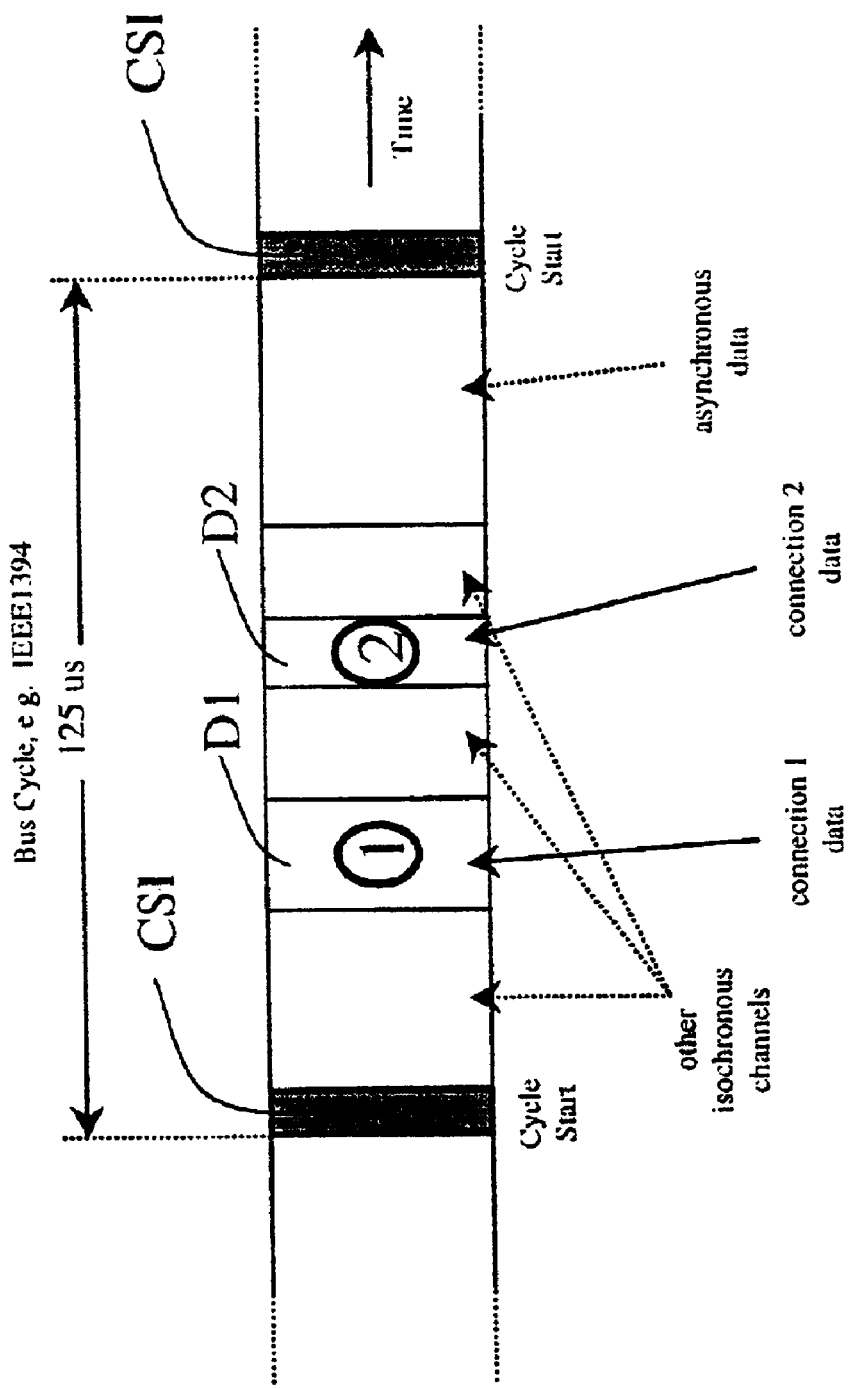
Figure 5:
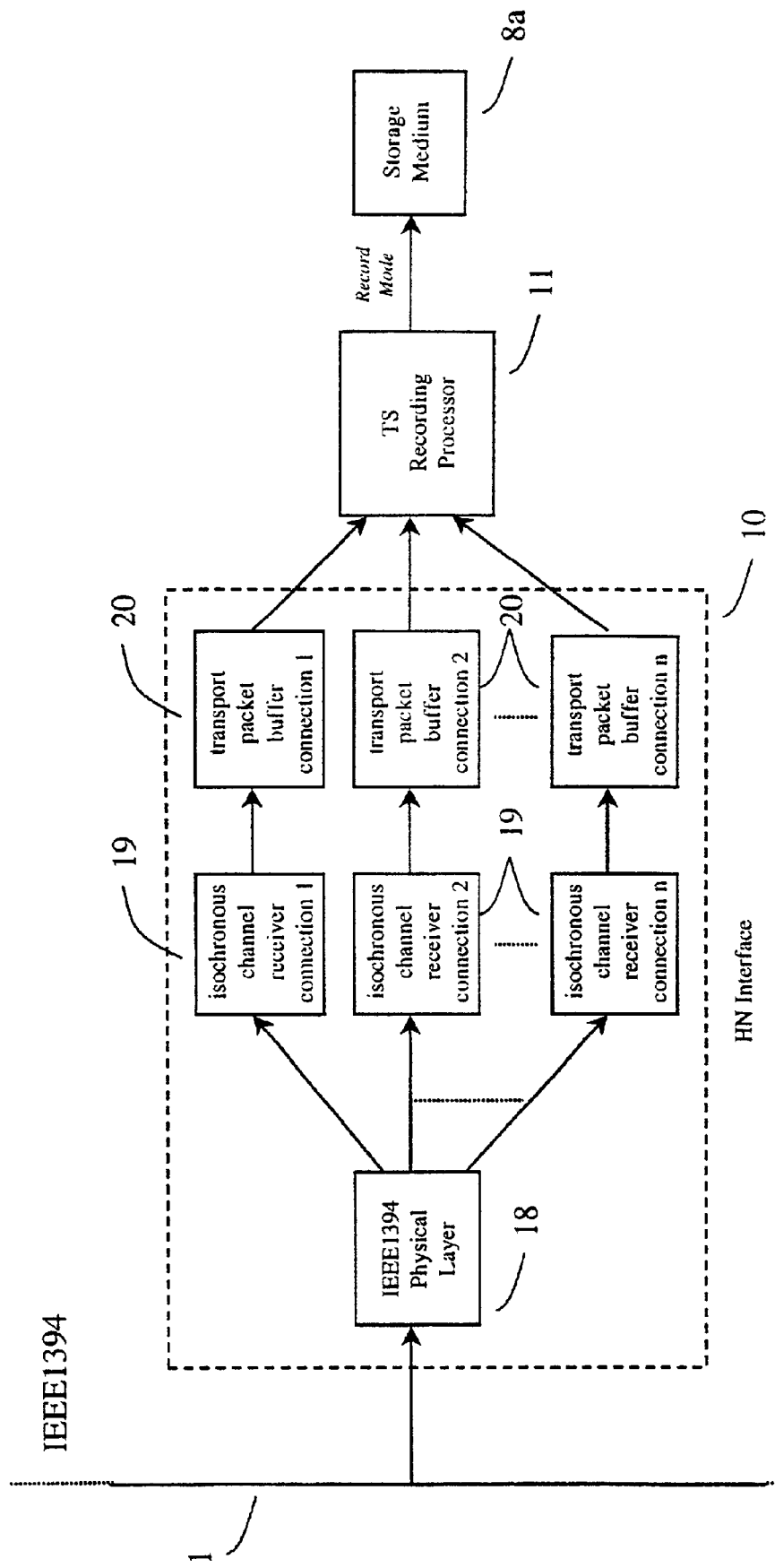
Figure 6:
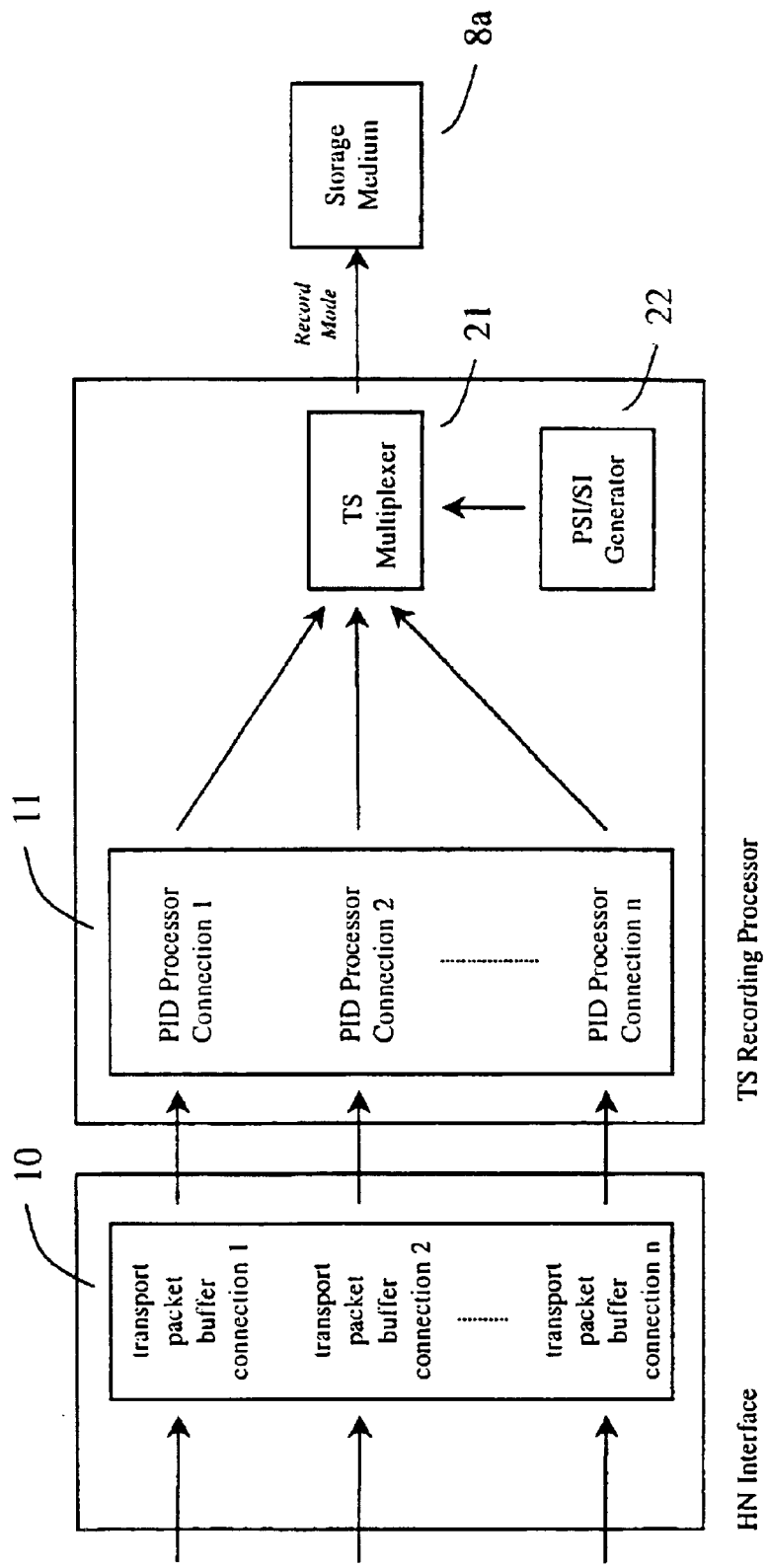
Figure 7:
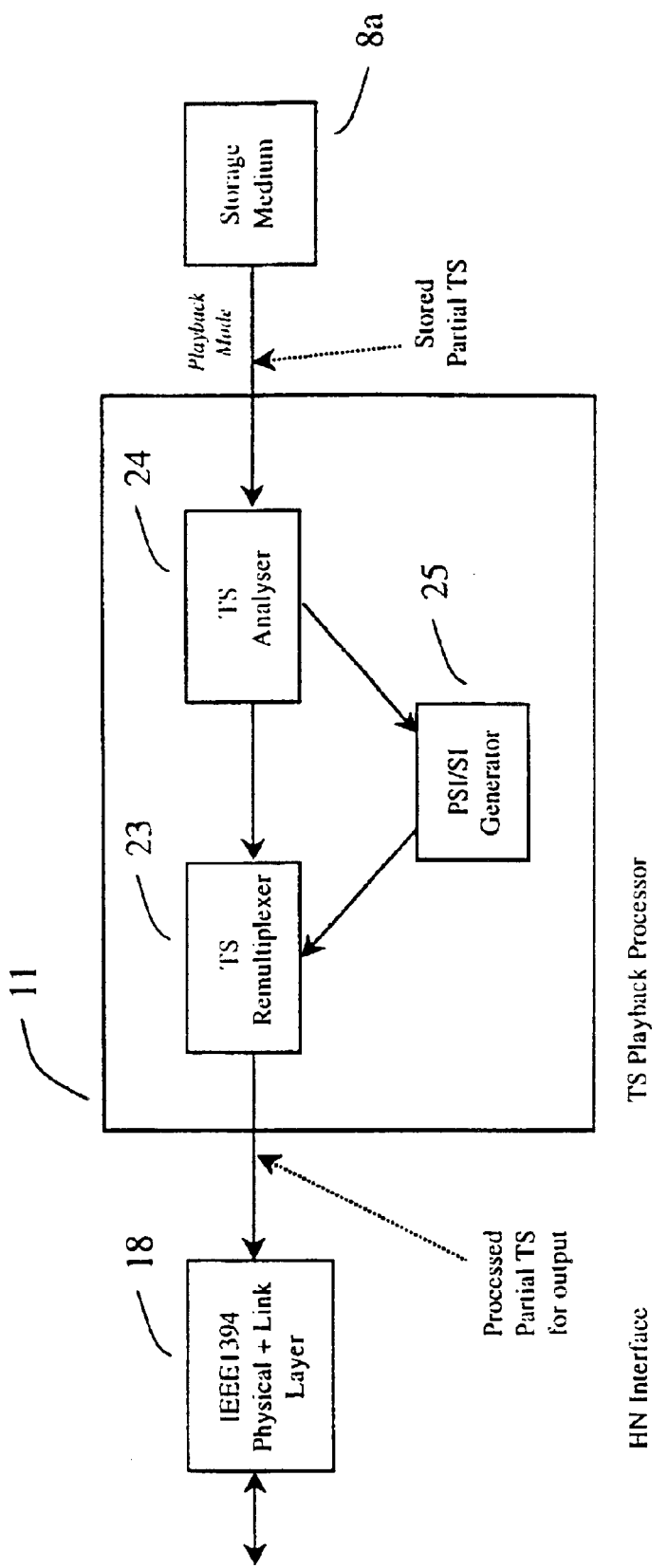
Figure 8:
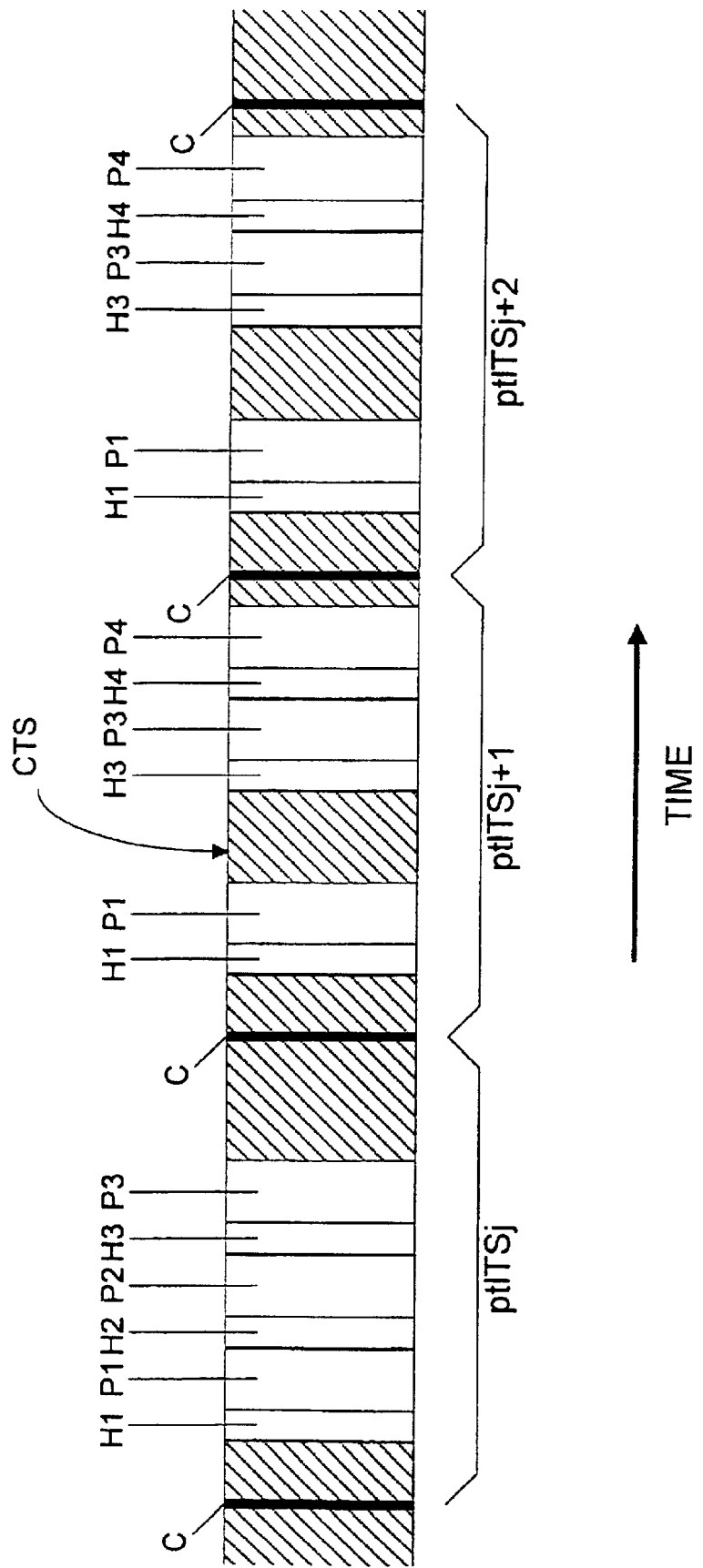

The present invention will be understood in more detail together with its numerous modifications and advantages from the following detailed description of preferred embodiments and by means of the accompanying drawings, wherein FIG. 1 is a schematical drawing of a home network to which the inventive method may be applied, FIG. 2 is a block diagram of a storage medium device involving the inventive method, FIG. 3 is a block diagram showing a preferred embodiment of the inventive method, FIGS. 4A, B elucidate the relationship between data on the bus/network and data on a storage medium stored according to a preferred embodiment of the inventive method, FIG. 5 is a block diagram showing details of an embodiment of an home network interface involving the inventive method, FIG. 6 is a block diagram showing schematically a recording section involving the inventive method, FIG. 7 is a block diagram showing a playback section involving the inventive method, and FIG. 8 shows a complete or combined transport stream CTS on a storage medium according to a preferred embodiment of the inventive method.

A typical home network to which the inventive method may be applied is shown schematically in FIG. 1.

Connected to a data bus system/interface 1—in particular on the basis of a IEEE1394-based bus/interface—are different devices serving as data sources for video and audio data. These devices are for example digital video broadcasting (DVB) receiver or HN-tuner 4, video cassette recorder (VCR) 3, home archives 2, particularly based on personal computers, interactive and service on demand terminals (SDT) 6, and DVD devices 7 or the like. Furthermore, controller and/or display devices 5 may be connected to the bus system 1. Transport streams TS containing information to be stored/recorded as well as control information may be supplied by these devices via the network bus 1 to a storage device 8 which can be controlled and monitored by a local monitor and user interface 9.

FIG. 2 shows by means of a schematical block diagram the overall organization of a storage medium device 8 connected to a common digital data bus 1 on the basis of a IEEE1394 bus/interface system and employing the inventive method for recording/storing transport streams of data.

The storage medium device 8 comprises the storage medium 8a per se as well as a TS recording processor 11 and a TS playback processor 12 which control and carry out the record mode and the playback mode of the inventive method employed by the storage medium device 8. The storage medium device 8 is connected to the common digital bus 1 via the home network (HN) interface 10. According to this connection transport streams TS of data may enter the storage medium device 8 or vice versa may be supplied to the digital bus 1.

On the other hand distinct data streams may be supplied via a A/V decoder 13 to a locally connected display device 14.

The organization of a preferred embodiment of the inventive method for recording/storing transport streams of data is shown by the flow chart of FIG. 3.

The preferred embodiment of FIG. 3 employs a waiting mode 15, a record mode 17 and a playback mode 16 for recording and playing back transport streams of data, respectively.

The ground state of the method is the waiting mode 15 in which the method checks for incoming requests for recording or playing back events from/to the home network HN.

Upon a request for recording an event from the home network to the storage media device 8 in step R1 it is checked in step R2 on whether or not the method is already in the playback mode and if so recording request is rejected. If the method is not in the playback mode or is already in the recording mode it starts to receive data from the isochronous channels in step R3. If necessary, PID processing is initiated in step R4. If the program selection/service information table has to be updated a new PSI/SI table is generated and incorporated into the partial transport stream ptlTS in step R5. Then recording is started in step R6.

If on the other hand it is requested to play back an event recorded previously in step P1, it is checked if the method is still in the recording mode in step P2 and if so the playback request is rejected. If the method is not in the record mode the method searches for the required data or event recorded on the storage medium 8 in step P3. Then the data or the event is played back to the HN in step P4.

Figure 4B:
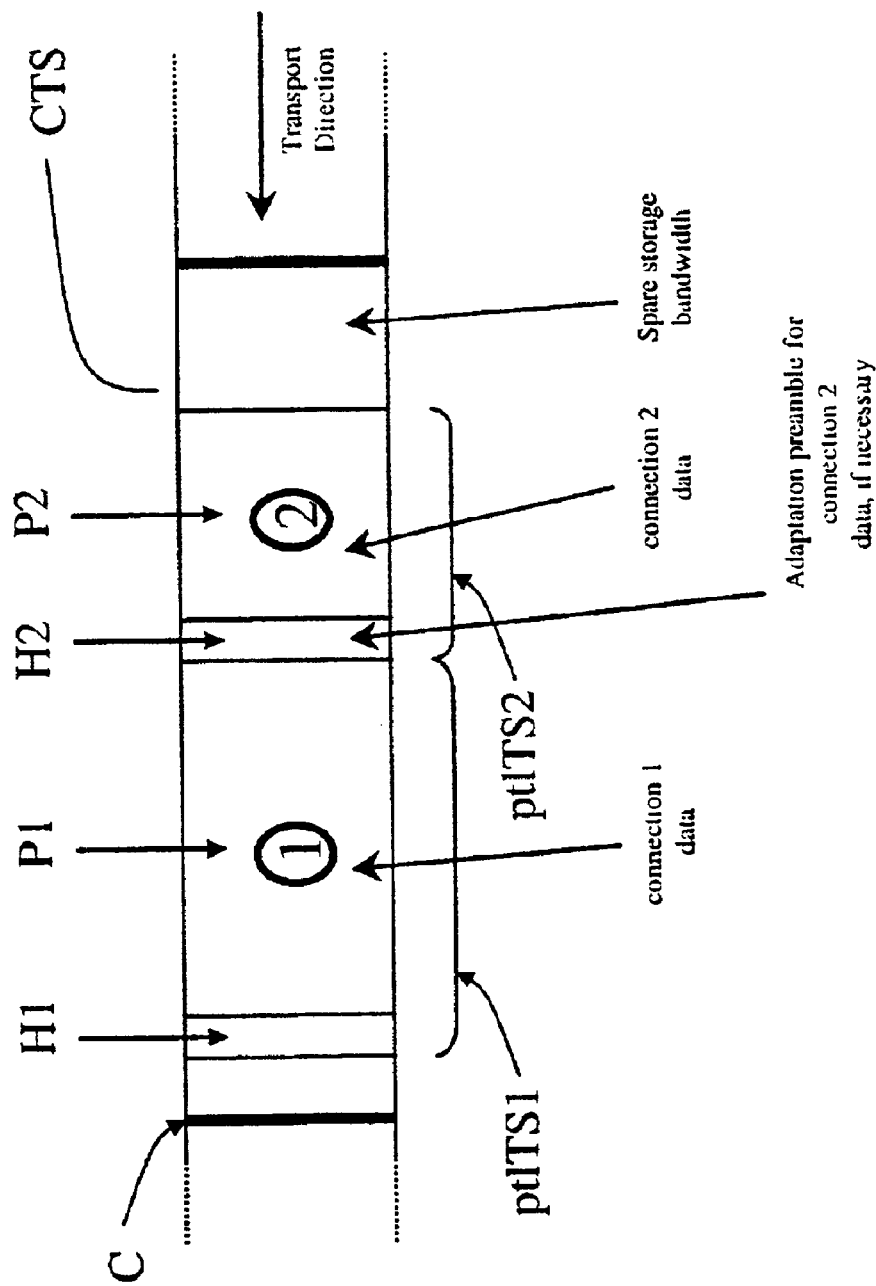

FIGS. 4A and 4B demonstrate the relationship between data present on the bus/network and data on a storage medium stored according to its preferred embodiments of the inventive method.

FIG. 4A shows the time structure of data present on a data bus/network for example of a data bus with an IEEE1394-structure having a bus cycle duration of 125 $\mu$s. On the data bus/network the beginning of each bus cycle is indicated by the so-called cycle start or cycle start indicator CSI. Depending on the band width of the data bus/network a distinct amount of data may be transported in a time multiplexed structure, i. e. the band width of the bus network is subdivided into sections for isochronous data channels as well as asynchronous data channels.

In the examples of FIG. 4A among other isochronous channels and asynchronous data data D1 and D2 for isochronous channel connections 1 and 2 are present for the bus cycle shown in FIG. 4A.

According to the temporal relationship of datablocks D1 and D2—defined by the time arrow of FIG. 4A—and/or the possibly embedded packet identifiers PID1 and PID2 the inventive method composes on the storage medium a complete or combined transport stream CTS in accordance with afore-mentioned temporal relationship of data packets D1 and D2 to be stored and in accordance with the given transport direction, as shown in FIG. 4B.

The beginning of each bus cycle may be represented on the storage medium within said complete or combined transport stream as a cycle start mark C. Data blocks D1 and D2 present on the data bus/network are embedded by the inventive method within partial transport streams ptlTS1 and ptlTS2, respectively. Within said partial transport streams ptlTS1 and ptlTS2 the data D1 and D2d per se are stored within packets P1 and P2 each of which being preceded by a so-called recording header H1 and H2. Each of said recording headers H1 and H2 allows the inventive method to identify and to adapt the recording/playback mode with the respective isochronous channels. Therefore, said recording headers H1, H2 serve as a identification or adaption preamble for the data of each isochronous channel and for each connection.

FIG. 8 shows the structure of a complete or combined transport stream CTS on a storage medium built up by employing the inventive method according to a preferred embodiment for the case that the number of events to be recorded changes with time.

The complete or combined transport stream CTS is organized by the temporal structure of the bus cycle of the data bus on which the home network is based. The bus cycle defines the bandwidth of the storage medium device 8 and also the length and the duration of the partial transport streams ptlTS. The combined transport stream CTS is built up by a sequence of successive partial transport streams ptlTSj, ptlTSj+1, ptlTSj+2 . . . , each of which comprising in this example a heading CSI-section indicating the start of a new bus cycle. The information content of each partial transport stream ptlTS is organized as a sequence or, series of packets P having in this example fixed and identical durations together with recording headers H having in this example fixed and identical locations.

Partial transport stream ptlTSj contains information from three different events and therefore recording headers H1, H2, H3 each of which is followed by packets P1, P2 and P3, respectively.

In partial transport stream ptlTSj+1 the recording of the second event H2, P2 has been terminated and the recording of a fourth event H4, P4 has been started. Therefore, the location of former second event is free or empty in this example and a fourth location is occupied by recording headers H4 followed by the information content of the fourth event/packet P4. The same applies for the next partial transport stream ptlTSj+2.

According to another realization of the inventive method, e. g. in MPEG-2 systems or the like, packets of information may be used to build said partial transport streams, which do not have a fixed duration and/or a strictly located PID but a PID which is embedded into the distinct packets.

FIG. 5 shows in more detail the HN interface utilized as the connecting part between the storage medium device 8 and the common data bus 1.

First of all the HN interface 10 comprises a physical layer 18 for connecting to the data bus 1, in the case of FIG. 5 it is a IEEE1394 physical layer.

For each connection 1 to n to the digital bus 1 there is provided an isochronous channel receiver, 19 and a transport packet buffer 20 to store the received information from the TS in an intermediate stage to allow for correct multiplexing. From the HN interface 10 the transport streams are supplied to the TS recording processor 11 and then to the storage medium 8a.

FIG. 6 shows by means of a block diagram more details of the TS recording processor 11 being connected to the HN interface 10.

For each connection to the digital data bus 1 the TS recording processor 11 comprises a PID process or 26, from which the transport streams are fed into a TS multiplexer 21 which forms a sequence of partial transport streams ptlTS and therefore the complete or combined transport stream CTS as a time series of the partial transport streams ptlTS. CTS is supplied to the storage medium 8a. If necessary, a PSI/SI generator 22 supplies additional information to the partial transport streams in the record mode of the inventive method.

FIG. 7 shows the organization of the home network utilizing the inventive method in the playback mode. Due to the MIC index or the like of the storage medium 8a the location of the requested information to be played back is found. Then the partial transport streams ptlTS are played back to the so-called TS playback processor 12. Due to the interaction of a TS analyzer 24, a TS re-multiplexer 23 and the PSI/SI generator 25 the requested information is selected from the partial transport stream ptlTS. Then the processed partial transport stream selected for output is fed into the physical layer 18 of the data bus connection of the HN interface.

What is claimed is:

1. Method for recording/storing transport streams of data, comprising the steps of:
   receiving a first transport stream from a first reproducing device and receiving a second transport stream from a second reproducing device substantially simultaneously with the reception of said first transport stream, wherein said first and second reproducing devices are separate and independent from each other and located in a home network;
   dividing each of said first and second transport streams into packets;
   assigning a recording header to each packet;
   generating a series of partial transport streams from said recording headers and said packets;
   combining said series of partial transport streams to form a combined transport stream; and
   recording/storing said combined transport stream.

2. Method according to claim 1, wherein the combined transport stream is recorded at a single recording medium.

3. Method according to claim 1, wherein transport streams from three or more separate and independent reproducing devices are received substantially simultaneously with each other.

4. Method according to claim 1, wherein said transport streams are divided with respect to a predetermined clock and/or to temporal relationships of said transport streams.

5. Method according to claim 4, wherein said transport streams are received from a common digital bus system, in particular from an i.LINK/IEEE 1394-based network bus and/or interface.

6. Method according to claim 4, wherein a clock cycle of constant frequency is used.

7. Method according to claim 4, wherein a bus cycle is used as a clock cycle.

8. Method according to claim 4, wherein each of said partial transport streams is generated with a heading cycle start indicating section for indicating the beginning of a new clock cycle and therefore the beginning of a new recorded/stored partial transport stream.

9. Method according to claim 5, wherein said transport streams are received by multiplexing said transport streams, in particular from isochronous channels of said commnon digital bus system.

10. Method according to claim 9, wherein the recording headers and/or the temporal relationships of said transport streams are received and/or generated at least from temporal relationships of said multiplexing step and/or of said isochronous channels.

11. Method according to claim 1, wherein each packet is paired and/or concatenated each at a time with said respective recording header within each partial transport stream, in particular with the recording headers preceding a respective packet.

12. Method according to claim 1, wherein the received transport streams or at least parts thereof are stored in buffer storage means in advance of and/or during generating said partial transport streams.

13. Method according to claim 1, wherein video and/or audio data are received at least in part within said transport streams.

14. Method according to claim 13, wherein said video and/or audio data are received in compressed or compactified format, in particular in a MPEG-2 format.

15. Method according to claim 1, wherein the received transport streams are stored as said series of partial transport streams to a physical storage media device selected from one of a magnetic tape, optical, magnetic, or magneto-optical disc devices.

16. Method according to claim 1, wherein if while receiving a number of transport streams, recording of a further transport stream is requested, it is checked whether sufficient bandwidth of the method or of the storage media device exists, and said request is rejected in the case of an insufficient band width, whereas if sufficient band width exists, the further transport stream is recorded.

17. Method according to claim 1, wherein in the case of terminating a request for recording a distinct transport stream and/or terminating said distinct transport stream itself, processing and recording of residual transport streams is continued.

18. Method according to claim 1, wherein a waiting mode is provided which is entered in the case that recording requests of all transport streams and/or the transport streams themselves are terminated.

19. Method according to claim 18, wherein a playback mode is provided for playing back transport streams previously recorded, and said playback mode can be entered only from said waiting mode.

* * * * *

UNITED STATES PATENT AND TRADEMARK OFFICE
CERTIFICATE OF CORRECTION

PATENT NO. : 6,925,577 B1
DATED : August 2, 2005
INVENTOR(S) : Paul Szucs et al.

It is certified that error appears in the above-identified patent and that said Letters Patent is hereby corrected as shown below:

Title page,
Item [75], Inventors, change "Markus Veltmann" to -- Markus Veltman --.

Signed and Sealed this

Eighteenth Day of October, 2005

JON W. DUDAS
*Director of the United States Patent and Trademark Office*